United States Patent [19]
Hecht et al.

[11] Patent Number: 5,918,279
[45] Date of Patent: Jun. 29, 1999

[54] DEVICE FOR MEASURING THE MASS OF A FLOWING MEDIUM

[75] Inventors: Hans Hecht, Korntal-Muenchingen; Heinz Rilling; Dieter Tank, both of Eberdingen; Uwe Konzelmann, Asperg, all of Germany

[73] Assignee: Robert Bosch GmbH, Stuttgart, Germany

[21] Appl. No.: 08/964,627

[22] Filed: Nov. 5, 1997

[30] Foreign Application Priority Data

Nov. 14, 1996 [DE] Germany ............ 196 47 081

[51] Int. Cl.⁶ .................................................. G01F 1/68
[52] U.S. Cl. ............................................... 73/204.21
[58] Field of Search ............... 73/204.21, 204.26; 137/8; 138/40, 41, 44, 37

[56] References Cited

U.S. PATENT DOCUMENTS

| | | |
|---|---|---|
| 4,660,587 | 4/1987 | Rizzie . |
| 5,090,241 | 2/1992 | Kobayashi . |
| 5,392,815 | 2/1995 | Stuart ............................. 138/37 |
| 5,412,983 | 5/1995 | Rombach et al. ............... 73/204.22 |
| 5,495,872 | 3/1996 | Gallagher et al. .............. 138/44 |
| 5,511,416 | 4/1996 | Shambayati ..................... 73/204.21 |
| 5,596,969 | 1/1997 | Lipinski .......................... 73/204.21 |
| 5,689,071 | 11/1997 | Ruffner et al. .................. 73/861.84 |

FOREIGN PATENT DOCUMENTS

| | | |
|---|---|---|
| 0 458 998 B1 | 12/1991 | European Pat. Off. . |
| 44 07 209 A1 | 9/1995 | Germany . |
| 1328915 | 9/1973 | United Kingdom . |
| 2032117 | 4/1980 | United Kingdom . |

*Primary Examiner*—Richard Chilcot
*Assistant Examiner*—Jewel Thompson
*Attorney, Agent, or Firm*—Edwin E. Greigg; Ronald E. Greigg

[57] ABSTRACT

A device for measuring the mass of a flowing medium, or flow rate meters, having a measuring element accommodated in a measurement support; upstream of the measuring element, a grid with flow openings is provided. To attain a substantially rotational symmetrical velocity distribution even in the case of a severely impeded oncoming flow, the grid has flow openings, which at least regionally have a different flow cross section. The flow cross sections of the flow openings are adapted to the oncoming flow, in order to bring about a flow with substantially even velocity distribution downstream of the grid. The device is intended for measuring the mass of a flowing medium, in particular for measuring the mass of aspirated air in internal combustion engines.

18 Claims, 3 Drawing Sheets

DEVICE FOR MEASURING THE MASS OF A FLOWING MEDIUM

BACKGROUND OF THE INVENTION

The invention is based on a device for measuring the mass of a flowing medium, also known as a flow rate meter. A device is already known (European Patent 0 458 998) that has a measuring element, accommodated in a measurement support, and a flow rectifier and a grid accommodated upstream of the measuring element. The flow rectifier is provided in order to generate as uniform a flow as possible over the entire inside cross section. The grid, permanently secured to the flow rectifier, is intended to create superfine eddies in the flow, in order to create the most constant possible flow conditions downstream of the grid, thereby stabilizing the measurement signal at the measuring element. The grid is a wire grid, which has individual wires woven into a meshlike structure. The wire grid has equidistant mesh widths, so that there are many flow openings all having the same flow cross section. If there is a severely impeded oncoming flow to the grid, which is characterized by a nonuniform distribution of velocity and major velocity gradients, however, the result is an uneven distribution of velocity, even downstream of the grid. Such a velocity distribution has a disadvantageous effect on the measurement accuracy of the measuring element, however.

In the known device, the grid is embedded in the heated state in a ring of the flow rectifier. Since the grid is made up of individual wires that are woven together into a mesh structure, the wires can shift somewhat relative to one another. Embedding the wire grid in the plastic has the disadvantage that a temperature change and/or aging of the plastic of which the flow rectifier is made can cause the wire grid to become dented or to sag. If the wire grid becomes dented or sags, the individual wires of the grid shift about, disadvantageously altering the characteristic curve of the measuring element. Moreover, securing the grid to the flow rectifier permanently has the disadvantage that only relatively complicated flow rectifiers, with grids of variable mesh width, can be combined with one another. There is also the risk that when the grid is embedded in the heated state in the ring of the flow rectifier, expelled plastic will remain in the flow rectifier, creating obstacles in the flow that can cause signal scattering, especially in mass production. Moreover, the provided embodiment of a ring that protrudes from a surface of the flow rectifier disposed at right angles to the flow direction, is relatively complicated from a production standpoint.

Another known option for securing the wire grid is to provide the wire grid with a flanged-over edge that has notches in which ribs can engage in order to position the wire grid. The mounting or flanging over of the edge of the wire grid is complicated from a production standpoint, on the one hand. On the other, the notches provided on the edge, because of unavoidable production variations, on being flanged over can be associated only relatively imprecisely with the flow openings of the wire grid, and accordingly a precise alignment of the flow openings of the wire grid with the openings of the flow rectifier is impossible.

OBJECT AND SUMMARY OF THE INVENTION

The flow rate meter according to the invention has the advantage over the prior art that even in the event of a severely impeded oncoming flow with an uneven distribution of velocity in the measurement support, a precise measurement outcome is established at the measuring element. It is especially advantageous that unavoidable installation tolerances of the measuring element in the measurement support now have hardly any influence on the measurement accuracy of the measuring element. It is also especially advantageous that certain flow regions, for instance regions involving heavy soiling, can be excluded or screened from the flow by means of the grid, so as to counteract deposits on the measuring element.

Advantageous further features and improvements to the device disclosed are possible with the provisions recited herein.

It is also advantageous that in an especially simple way, grids of variable mesh width, for instance with various flow cross sections, can be made. It is especially advantageous that sagging or denting of the grid can be prevented, which increases the measurement accuracy and in particular the measurement stability over a long-term operation of the device. It is also advantageous that grids with a variable mesh width or variable flow cross sections can be produced without special expenditure for tools. For an intended dismantling of the device, the flow rectifier and the grid are individually present and can then be easily separated for recycling. The contemplated mode of producing the grid by punching is especially advantageous, because it allows producing the flow cross sections of the grid with very good accuracy, yet without increasing the production cost for the grid.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
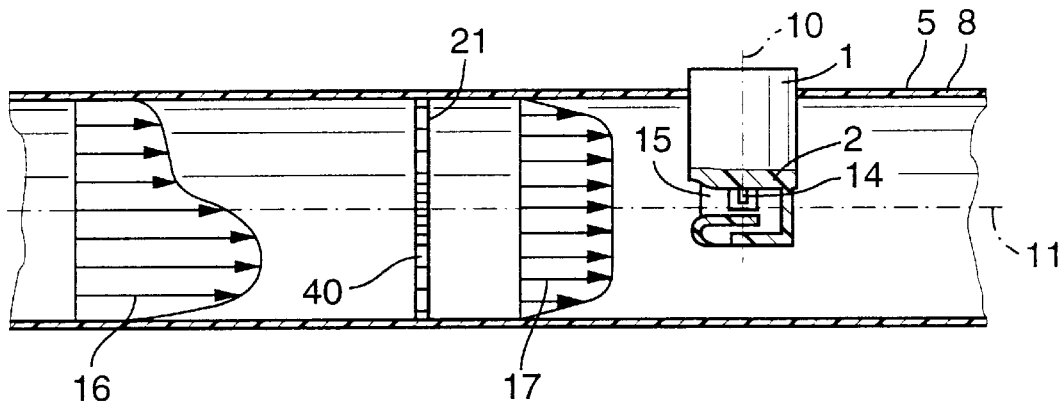
FIG. 1 schematically shows how a grid embodied according to the invention acts upon the flow.
Figure 2:
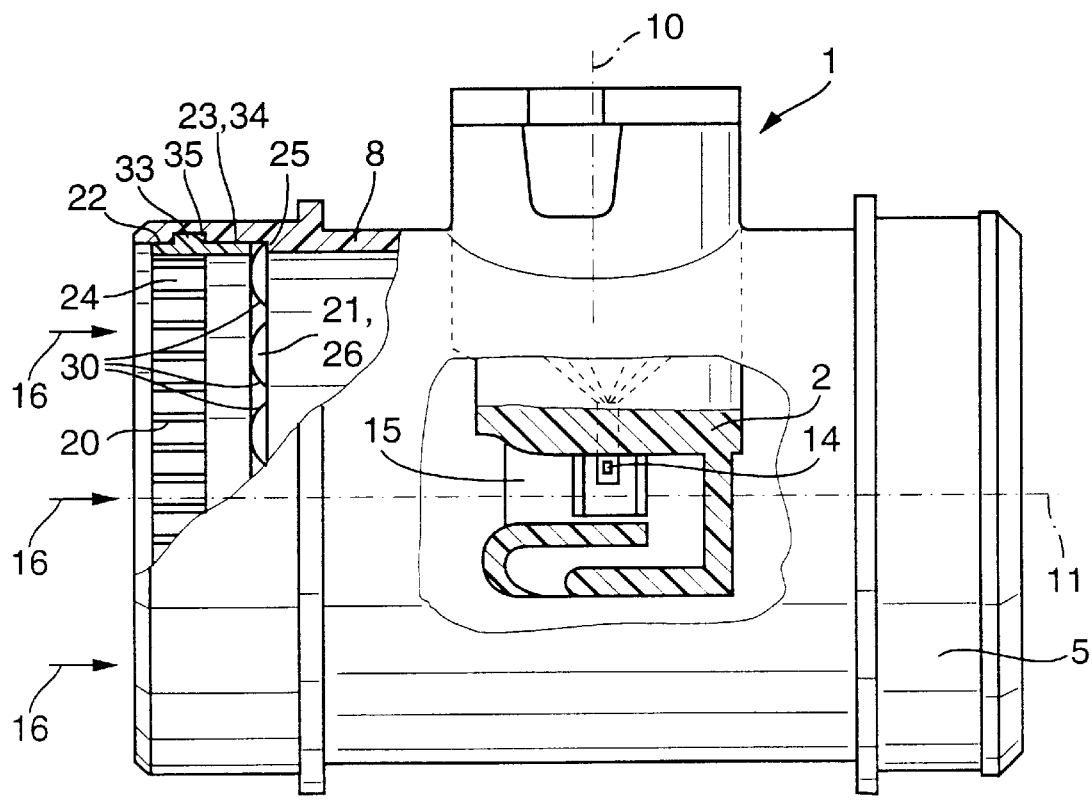
FIG. 2 shows a device, equipped with the grid embodied according to the invention, in a fragmentary sectional view.

In FIGS. 1 and 2, a device 1 for measuring the mass of a flowing medium, in particular the aspirated air mass of internal combustion engines, is shown in cross section. The engine may be a mixture-compressing engine with externally supply ignition, or an air-compressing, self-igniting engine. The device 1 has a measurement part 2 that is inserted, for instance in plug-in fashion, into a measurement support 5 of the device 1. The measurement part 2 has a slender, barlike, parallelepiped shape extending longitudinally of an insertion axis 10, and is introduced, for instance in plug-in fashion, into an opening made in a wall 8 of the measurement support 5. The wall 8 defines a flow cross section, which for example has a circular cross section, in the middle of which a center axis 11 extends parallel to the wall 8, this axis being oriented at right angles to the insertion axis 10. A measuring element 14 is introduced with the measurement part 2 into the flowing medium. A measurement conduit 15, in which the measuring element 14 for measuring the medium flowing in the measurement support 5 is accommodated, is embodied in the measurement part 2 of the device 1. The structure of such a measurement part 2 with a measuring element 14 is adequately well known to one skilled in the art, for instance from German Offenlegungsschrift DE-OS 44 07 209, U.S. Ser. No. 545,583 filed Nov. 3, 1995, whose disclosure is hereby incorporated by reference.

Upstream of the measurement part 2, a grid 21 is provided, as shown in FIG. 1 is intended to compensate for more or less major nonuniformities in the velocity distribution in the oncoming flow to the measuring element 14. Such nonuniformities in the velocity distribution, indicated by corresponding velocity arrows 16 in FIG. 1, are due to flow obstacles, such as an elbow, not shown, provided upstream of the grid 21, or an air filter. By the embodiment of the grid 21, according to the invention, the intent is, at least in the region of the measurement part 2, to generate a substantially rotationally symmetrical velocity distribution, represented by velocity arrows 17 in FIG. 1, that has no major velocity gradients, so as to achieve a precise measurement result at the measuring element 14.

As shown in FIG. 2, besides the grid 21 a flow rectifier 20 may also be provided, which is accommodated upstream of the grid 21 in the measurement support 5. By way of example, the flow rectifier 20 comprises plastic and is made by injection molding and has many openings 24, for instance rectangular in shape. For mounting purposes, the grid 21 is introduced into an opening 23, for instance round in shape, provided on the upstream end of the measurement support 5, until with its back face 26 it rests on a stop 25 that reduces the size of the cross section of the opening 23. Next, the flow rectifier 20 can be inserted into the opening 23, until it rests on spring elements 30 provided on the grid 21. For permanent securing of the flow rectifier 20 in the opening 23, the flow rectifier 20 has barblike detent hooks 33, protruding approximately radially outward from its outer face 22, for instance, which can lock into a groove 25 provided in an inner wall 34 of the opening 23. As the flow rectifier 20 is introduced into the opening 23, the spring elements 30 of the grid 21 are elastically deformed and exert an axially oriented spring force on the flow rectifier 20. Upon reaching the installed position of the flow rectifier 20 in the opening 23, the detent hooks 33 lock into the groove 35, and with the aid of the spring force of the spring elements 30 they permanently retain the flow rectifier 20 and the grid 21 in the opening 23 under axial tension. A detent ring encompassing the circumference of the flow rectifier 20 may also act as the detent hooks 33. The spring elements 30 not only can be embodied on the grid 21 in such a way that they rest on the flow rectifier 20 but can also rest on the stop 25 or can rest in alternation on the flow rectifier 20 and the stop 25.

Figure 3:
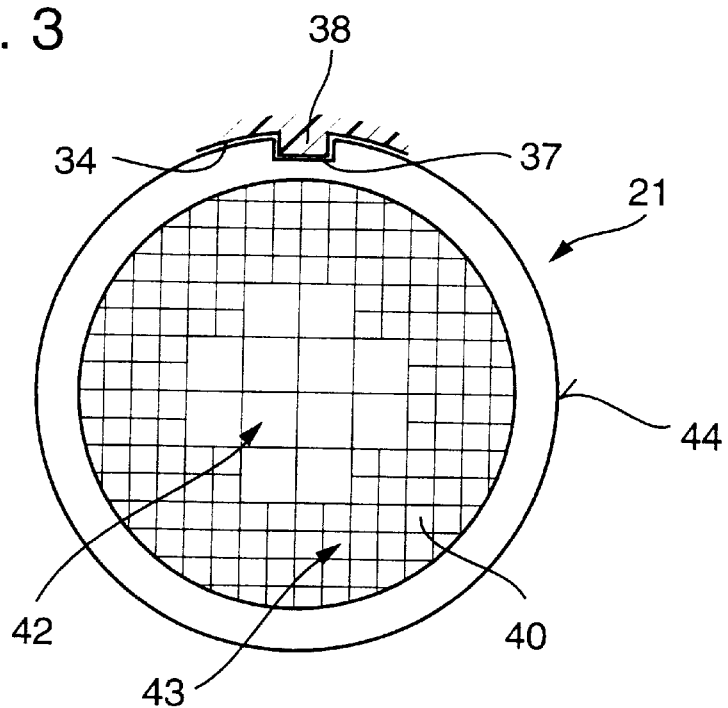
FIG. 3 is a plan view of the grid in a first exemplary embodiment of the invention.

The radial orientation of the grid 21 with regard to the openings 24 in the flow rectifier 20 is effected by means of at least one notch 37, shown in FIG. 3, provided on one edge 44 of the grid 21. The at least one notch 37 extends radially inward from the edge 44 and has a rectangular shape, for instance, in order to receive a correspondingly formed rib 38 extending radially inward from the inner wall 34 of the opening 23 of the measurement support 5. The notch 37 is recessed with a precisely predeterminable location relative to the flow openings 40 of the grid 21, so as to align the flow openings 40 precisely with the openings 24 of the flow rectifier 20. The location of the at least one notch 37 is unequivocally defined relative to the flow openings 40 of the grid 21. The at least one notch 37, like the grid 21 and the flow openings 40, can be made by being punched out of a thin metal strip. Particularly in mass production, in a simple way this produces a very exact alignment and association of the flow openings 40 of the grid 21 with regard to the notch 37 and hence to the openings 24 of the flow rectifier 20.

According to the invention, the grid 21 has a grid structure, which is composed of a plurality of flow openings 40 in such a way that at least regionally, various-sized flow cross sections are present. A first exemplary embodiment of such a grid 21 is shown in more detail in FIG. 3, which is a plan view on the grid 21. The grid 21 is circular in its outer shape, for instance, and by way of example has many rectangular flow openings 40, which decrease in size from a middle region 42 in the center of the grid 21 toward the edge 44, so that in an outer region 43 of the grid 21, there are fine-pore flow openings 40, while in the middle these openings have large pores. The refining of the grid 21 from the middle region 42 toward the edge 44, in the event of an uneven velocity distribution with high speeds in the vicinity of the wall, enables a corresponding compensation, so that at a certain distance from the grid 21 a rotationally symmetrical velocity distribution prevails, which is characterized by a substantially constant velocity distribution over the flow cross section.

Figure 4:
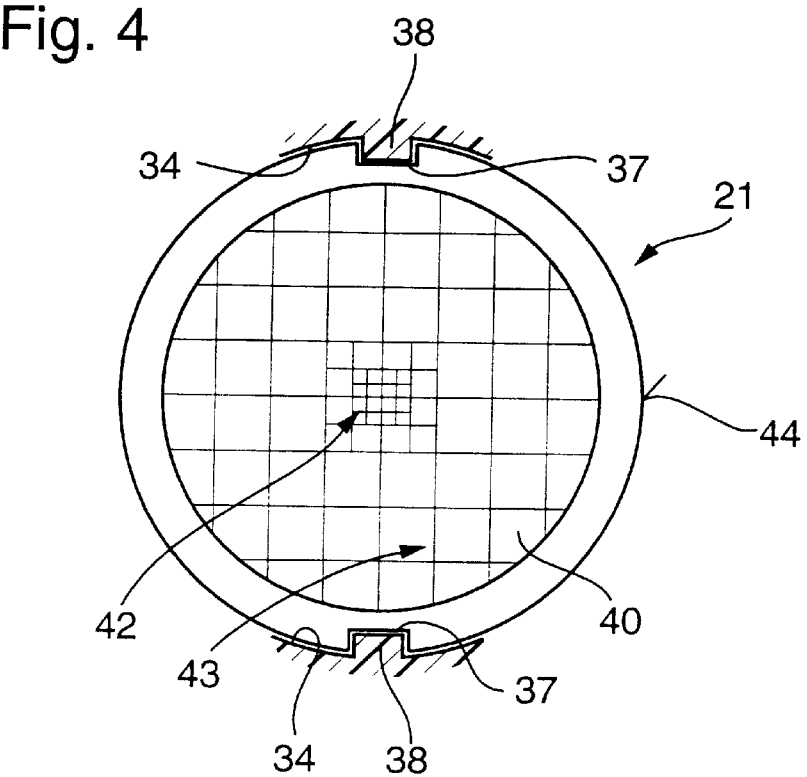
FIG. 4 is a plan view of the grid in a second exemplary embodiment of the invention.

However, it is also possible, as shown in FIG. 4 for a second exemplary embodiment of the grid 21, to embody the grid 21 with smaller or narrower-mesh flow openings 40 in the middle region 42 and larger or coarser-mesh flow openings 40 in the region of the edge 44. This kind of structure of the grid 21 makes it possible to purposefully reduce velocity spikes in the region of the middle axis 11 in the oncoming flow through the narrower-mesh flow openings 40, so that once again a uniform velocity distribution over the flow cross section, or a constant velocity downstream of the grid 21, results.

Figure 5:
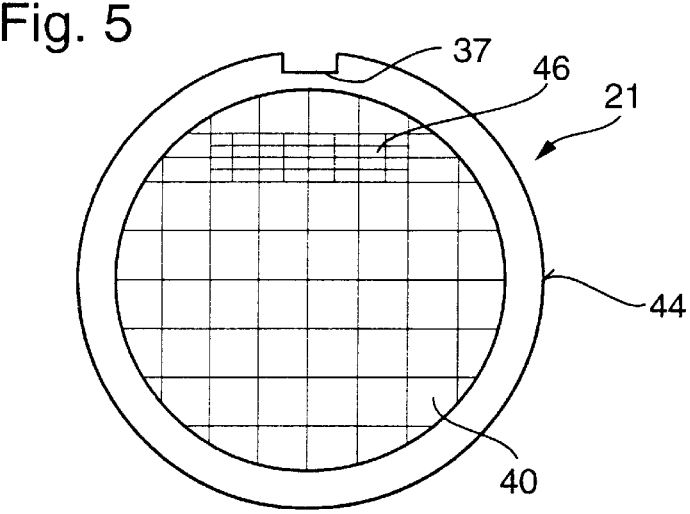
FIG. 5 is a plan view of the grid in a third exemplary embodiment of the invention.

As shown in FIG. 5 for a third exemplary embodiment of the grid 21 of the invention, it is also possible for only very specific regions of the flow, for instance heavily soiled regions, to be faded out by refining the grid 21, specifically by providing substantially narrower flow openings 46 there. The flow cross sections of the flow openings 40 may for instance be embodied as triangular, quadrangular, pentagonal, hexagonal, or many-sided, or round or oval.

Figure 6:
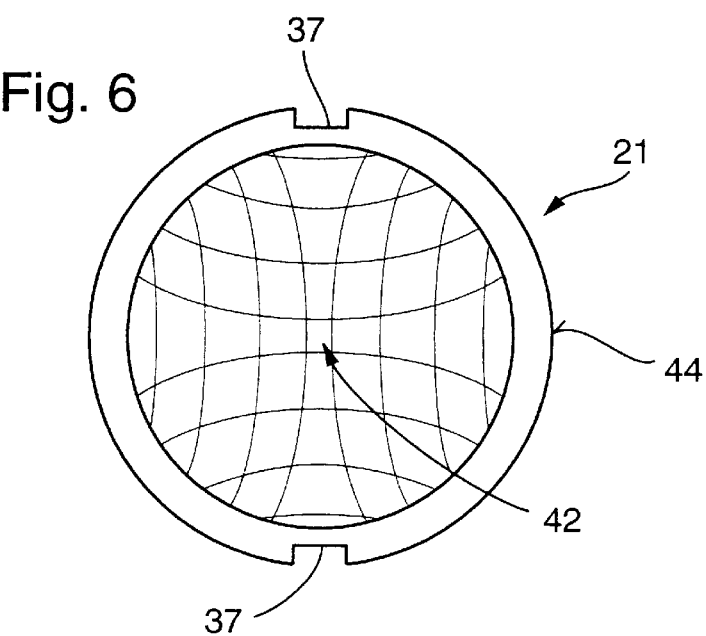
FIG. 6 is a plan view of the grid in a fourth exemplary embodiment of the invention.

However, it is also conceivable, as shown in a fourth exemplary embodiment of the invention in FIG. 6, to make the flow openings 40 asymmetrical, for instance in beadlike form toward the edge 44, with increasing distortion.

Figure 7:
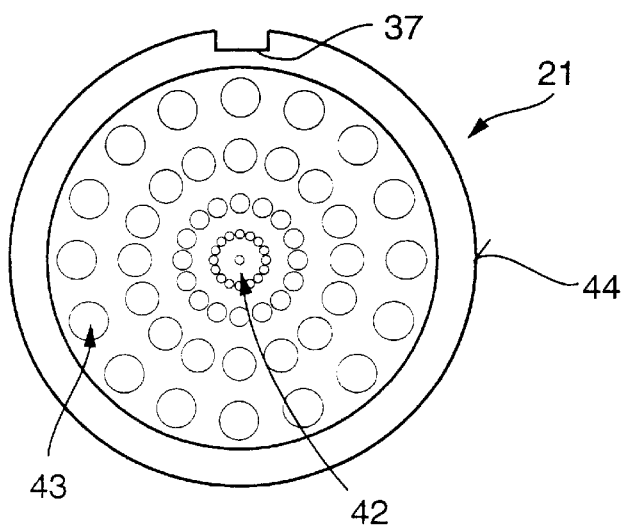
FIG. 7 is a plan view of the grid in a fifth exemplary embodiment of the invention.

It is also possible, as shown in FIG. 7 for a fifth exemplary embodiment according to the invention of the grid 21, to provide many circular flow openings 40, for instance, which have a narrow flow cross section in the middle region 42 and a greater flow cross section toward the edge 44, for instance. However, it is also conceivable for the flowing openings 40 to have a smaller flow cross section in the outer region 43 and a larger flow cross section toward the middle region 42.

The production of the flow openings 40 in the grid 21 can be done by punching them out of a thin metal strip. However, it is also possible to make the flow openings 40 using a laser. It is also conceivable to substitute ceramic for the grid 21, for instance in order to obtain the flow openings 40 by etching them out of the ceramic substrate.

The foregoing relates to preferred exemplary embodiments of the invention, it being understood that other variants and embodiments thereof are possible within the spirit and scope of the invention, the latter being defined by the appended claims.

We claim:

1. A device for measuring the mass of a flowing medium, comprising a measurement support, a measuring element and a grid provided upstream of the measuring element, the grid having many flow openings, in which the flow openings (40) at least regionally have a variable flow cross section, the grid (21) has at least one notch (37) on an edge (44) that has a predetermined location relative to the flow openings (40), and the at least one notch (37) receives at least one rib (38) that extends radially inward from an inner wall (34) of an opening (23) in the measurement support (5).

2. A device in accordance with claim 1, in which the flow cross sections of the flow openings (40) are adapted to an oncoming flow to the grid (21) in such a way that downstream of the grid (21), a flow with an essentially uniform velocity distribution prevails.

3. A device in accordance with claim 1, in which a flow rectifier (20) is provided upstream of the grid (21).

4. A device in accordance with claim 2, in which a flow rectifier (20) is provided upstream of the grid (21).

5. A device in accordance with claim 1, in which the flow cross sections of the flow openings (40) have a rectangular or beadlike or round or oval shape.

6. A device in accordance with claim 1, in which the grid (21) has flow openings (40), which have a small flow cross section in a middle region (42) of the grid (21) and an increasingly large flow cross section toward an outer region (43) of the grid (21).

7. A device in accordance with claim 2, in which the grid (21) has flow openings (40), which have a small flow cross section in a middle region (42) of the grid (21) and an increasingly large flow cross section toward an outer region (43) of the grid (21).

8. A device in accordance with claim 3, in which the grid (21) has flow openings (40), which have a small flow cross section in a middle region (42) of the grid (21) and an increasingly large flow cross section toward an outer region (43) of the grid (21).

9. A device in accordance with claim 4, in which the grid (21) has flow openings (40), which have a small flow cross section in a middle region (42) of the grid (21) and an increasingly large flow cross section toward an outer region (43) of the grid (21).

10. A device in accordance with claim 5, in which the grid (21) has flow openings (40), which have a small flow cross section in a middle region (42) of the grid (21) and an increasingly large flow cross section toward an outer region (43) of the grid (21).

11. A device in accordance with claim 1, in which the grid (21) has flow openings (40), which have a large flow cross section in a middle region (42) of the grid (21) and an decreasingly large flow cross section toward an outer region (43) of the grid (21).

12. A device in accordance with claim 1, in which the grid (21) has a defined region (46) with a small flow cross section.

13. A device in accordance with claim 1, in which the flow openings (40) are produced by being punched out of a thin metal strip.

14. A device in accordance with claim 13, in which the grid (21), on an edge (44), has at least one notch (37) that has a predetermined location relative to the flow openings (40).

15. A device in accordance with claim 14, in which the at least one notch (37) receives at least one rib (38) extending radially inward from an inner wall (34) of an opening (23) in the measurement support (5).

16. A device in accordance with claim 1, in which the flow openings (40) are produced by means of a laser.

17. A device in accordance with claim 1, in which the flow openings (40) are produced by being etched out of a ceramic substrate.

18. A device for measuring the mass of a flowing medium, comprising a measurement support, a measuring element and a grid (21) provided upstream of the measuring element, the grid having many flow openings which are punched out of a thin strip of metal, in which the flow openings (40) at least regionally have a variable flow cross section, the grid (21) has at least one notch (37) on an edge (44) that has a predetermined location relative to the flow openings (40), and the at least one notch (37) receives at least one rib (38) that extends radially inward from an inner wall (34) of an opening (23) in the measurement support (5).

* * * * *